United States Patent
Banerjee et al.

(10) Patent No.: US 10,410,385 B2
(45) Date of Patent: Sep. 10, 2019

(54) GENERATING HYPERGRAPH REPRESENTATIONS OF DIALOG

(71) Applicant: International Business Machines Corporation, Armonk, NY (US)

(72) Inventors: Prithu Banerjee, Vancouver (CA); Manikandan Padmanaban, Bangalore (IN); Biplav Srivastava, Bangalore (IN); Srikanth G. Tamilselvam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 15/047,881

(22) Filed: Feb. 19, 2016

(65) Prior Publication Data
US 2017/0243382 A1    Aug. 24, 2017

(51) Int. Cl.
G06T 11/20    (2006.01)
G06F 17/27    (2006.01)
G06F 3/0484   (2013.01)
G06Q 10/10    (2012.01)

(52) U.S. Cl.
CPC ........ *G06T 11/206* (2013.01); *G06F 17/2785* (2013.01); *G06Q 10/107* (2013.01)

(58) Field of Classification Search
None
See application file for complete search history.

(56) References Cited

U.S. PATENT DOCUMENTS

| | | |
|---|---|---|
| 6,346,952 B1 | 2/2002 | Shtivelman |
| 7,082,458 B1 | 7/2006 | Guadagno et al. |
| 7,545,758 B2 | 6/2009 | Caspi et al. |
| 8,140,543 B2 | 3/2012 | Chen et al. |
| 8,626,832 B2 | 1/2014 | Jerrard-Dunne et al. |
| 8,683,351 B2 | 3/2014 | Cheng et al. |
| 8,909,643 B2 | 12/2014 | Ankan et al. |

(Continued)

FOREIGN PATENT DOCUMENTS

WO    2002093414 A1    11/2002

OTHER PUBLICATIONS

Jo et al, "Aspect and Sentiment Unification Model for Online Review Analysis", Proceeding WSDM '11 Proceedings of the fourth ACM international conference on Web search and data mining, pp. 815-824, Hong Kong, China—Feb. 9-12, 2011, ACM New York, NY, USA © 2011.*

(Continued)

*Primary Examiner* — Tize Ma
(74) *Attorney, Agent, or Firm* — Ryan, Mason & Lewis, LLP

(57) ABSTRACT

Methods, systems and computer program products for generating hypergraph representations of dialog are provided herein. A computer-implemented method includes analyzing at least one dialog to identify one or more topics and one or more contributions by one or more persons to the one or more topics, tracking evolution of the identified topics over time in the at least one dialog, generating a hypergraph representation of the at least one dialog utilizing the identified topics, the identified contributions and the tracked evolution of the identified topics, and providing an interactive visualization tool based on the hypergraph representation of the at least one dialog.

14 Claims, 11 Drawing Sheets

(56) References Cited

U.S. PATENT DOCUMENTS

| | | |
|---|---|---|
| 8,924,491 B2 | 12/2014 | Cai et al. |
| 2005/0076060 A1* | 4/2005 | Finn .................... G06Q 20/201 |
| 2008/0281927 A1 | 11/2008 | Vanderwende et al. |
| 2012/0136939 A1 | 5/2012 | Stern et al. |
| 2013/0006973 A1 | 1/2013 | Caldwell et al. |
| 2014/0074770 A1* | 3/2014 | Morsi ............... G06F 17/30551 |
| | | 707/600 |
| 2014/0122228 A1 | 5/2014 | Wical |
| 2014/0188457 A1 | 7/2014 | Fink et al. |
| 2015/0269383 A1* | 9/2015 | Lang ..................... G06F 21/57 |
| | | 726/1 |
| 2015/0347480 A1* | 12/2015 | Smart ............... G06F 17/30327 |
| | | 707/743 |
| 2017/0228445 A1* | 8/2017 | Chiu ................ G06F 17/30557 |

OTHER PUBLICATIONS

Deepak et al., Entity Linking for Web Search Queries. ECIR, 2015.
Bhatia et al., Summarizing Online Forum Discussions—Can Dialog Acts of Individual Messages Help? 2014.
Donath et al., Visualizing Conversation, 1999.
Gao et al., Dynamic Shortest Path Algorithms for Hypergraphs, 2012.
Gurevych et al., Semantic Similarity Applied to Spoken Dialogue Summarization, 2004.
Ren et al., Summarizing Web Forum Threads based on a Latent Topic Propagation Process, CIKM'11, Oct. 24-28, 2011.

* cited by examiner

GENERATING HYPERGRAPH REPRESENTATIONS OF DIALOG

FIELD

The present invention relates to dialogs, and more specifically, to techniques for analyzing dialogs.

BACKGROUND

Dialog systems can play a key role in the functioning of an organization, such as a business, government, club, group or other entity. For example, many critical decisions may result from discussions in chat systems, or chat-like conversation systems. Organizations may seek to capture and analyze these decisions to make various improvements to a structure of the organization. For example, analyzing decision making may allow an organization to restructure its member hierarchy or to group members for future projects to improve or streamline future decision making.

SUMMARY

Embodiments of the invention provide techniques for generating hypergraph representations of dialog.

In one embodiment, an exemplary computer-implemented method comprises analyzing at least one dialog to identify one or more topics and one or more contributions by one or more persons to the one or more topics, tracking evolution of the identified topics over time in said at least one dialog, generating a hypergraph representation of said at least one dialog utilizing the identified topics, the identified contributions and the tracked evolution of the identified topics, and providing an interactive visualization tool based on the hypergraph representation of said at least one dialog.

In another embodiment, an exemplary computer-implemented method comprises receiving at least one dialog, analyzing said at least one dialog using topic modeling and sentiment analysis to identify topics and sub-topics, utilizing a penalty computation to track evolution of the identified topics and sub-topics over time in said at least one dialog, generating a hypergraph representation of said at least one dialog based on the tracked evolution of the identified topics and sub-topics, wherein the hypergraph representation comprises (i) a plurality of nodes corresponding to persons contributing to the identified topics and sub-topics and (ii) a plurality of hypergraph edges, wherein each hypergraph edge is associated with a given one of the identified topics or sub-topics and connects at least two of the nodes, and providing an interactive visualization tool based on the hypergraph representation of said at least one dialog.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
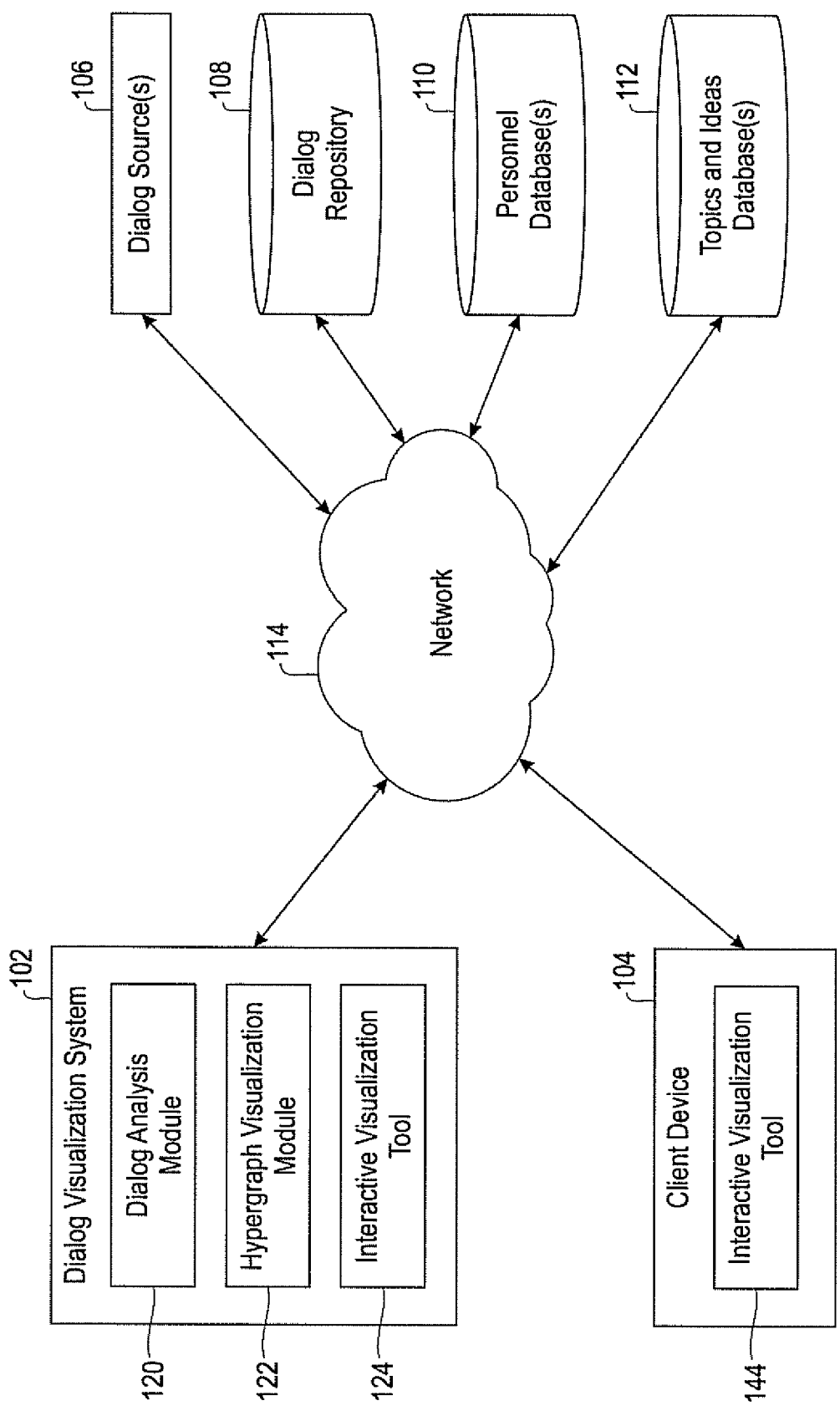
FIG. 1 depicts a system for generating hypergraph representations of dialog, according to an exemplary embodiment of the present invention.

Illustrative embodiments of the invention may be described herein in the context of illustrative methods, systems and devices for generating hypergraph representations of dialog. However, it is to be understood that embodiments of the invention are not limited to the illustrative methods, systems and devices but instead are more broadly applicable to other suitable methods, systems and devices.

As discussed above, dialog systems can play a key role in the functioning of an organization or entity. Critical decisions may be discussed or made in chat systems or chat-like conversation systems or applications. For various analytics purposes, it is thus important to capture decisions in a chat summary, including how decisions evolved in one or more conversations or dialogs as well as who are the key contributors for decisions. Understanding decision processes can allow an organization or entity to adjust its member hierarchy or assign members to future tasks so as to streamline and improve future decision making, as well as to evaluate existing members and potentially reward members for their contributions to valuable decisions.

In some contexts, dialogs or conversations are used to propose thoughts and receive feedback. The feedback generally contains affirmative or disagreement words from participants, which can be considered as a decision. The source, or proposed thought, may be considered as an idea. Dialogs that build to a decision are candidates for summarization. A dialog, however, does not require instant agreement to be a candidate for summarization. Dialogs containing messages in the same topic which lead to agreement or disagreement are candidates for summarization. Visualization of the dialog may be performed using drill-down actions for ideas and inferring attributes.

Various techniques may be used to summarize a dialog or conversation. For example, dialog summarization may be used to preserve the spatial and temporal context of a dialog composed of a plurality of postings, messages, documents, emails, etc. A dialog can be summarized by parsing incoming queries for keywords, and providing the keywords as a summary of the dialog. Topic tracking may be used to identify topics in a dialog or conversation, and the identified topics can be used to classify incoming messages or postings to track topics over time. Topic graphs may be used to show or visualize topic evolution over time. Topic evolution and emergence may be inferred from a set of documents, messages, postings, emails, etc. by identifying topics, words and topic words and setting such information in matrices for analysis within temporal constraints. Dialog content may be captured in a tree-like structure or using hypergraphs.

In some embodiments, topics and decisions in one or more dialogs or conversations are identified with joint use of a topic model and sentiment analysis. Evolving topics, sub-topics and sentiments are tracked using a penalty score to measure the drift in topics over time so as to quantify how topics evolve. The contributions of dialog participants in topics and decisions are identified over time. Hypergraph representations of dialog are generated using identified topics, identified contributions of the participants and the tracked evolution of topics. A multi-layered hypergraph based visualization tool is provided, allowing for various analysis based on hypergraph representations of dialog. Among other features, the hypergraph based visualization tool may capture central topics and corresponding participants or contributors across a time frame. Various other attributes, such as sentiment values, may also be captured across a time frame using the hypergraph based visualization tool.

The hypergraph representation may be used to visualize the evolution of ideas and contributions to the ideas or topics through containment features of hypergraphs. Multi-attribute node representation in the hypergraph allows for the capture of complex features including, but not limited to, name, role, interested areas, etc., to show/hide ideas and contributors or to provide weights for ideas and contributors.

FIG. 1 shows a system 100 for generating hypergraph representations of dialog. The system 100 includes dialog visualization system 102, client device 104, dialog source(s) 106, dialog repository 108, personnel database(s) 110 and topics and ideas database(s) 112. The dialog visualization system 102 is coupled to the client device 104, dialog source(s) 106, dialog repository 108, personnel database(s) 110 and topics and ideas database(s) 112 via network 114. Network 114 may be any one of or a combination of different network types.

While FIG. 1 shows a single client device 104, embodiments are not so limited. In some embodiments, multiple client devices 104 may be coupled or otherwise connected to dialog visualization system 102 via network 114. In other embodiments, system 100 may not include any client device 104. Similarly, the system 100 in other embodiments may include multiple distinct instances of elements 106, 108, 110 and 112. In some embodiments, certain ones of elements 106, 108, 110 and 112 may be combined or incorporated within dialog visualization system 102. For example, the dialog repository 108, personnel database(s) 110 and topics and ideas database(s) 112 may in some embodiments be part of a single database or data store implemented within dialog visualization system 102 or external to dialog visualization system 102.

The dialog visualization system 102 includes a dialog analysis module 120, hypergraph visualization module 122 and interactive visualization tool 124. The client device 104 also includes an interactive visualization tool 144. The dialog visualization system 102 may include one or more application programming interfaces (APIs) or other features permitting client devices or users to access the interactive visualization tool 124 on the dialog visualization system 102 itself. In other embodiments, the APIs or other features may be used to allow the dialog visualization system 102 to instantiate or provision an interactive visualization tool on another device, such as client device 104. For example, the dialog visualization system 102 may provide interactive visualization tool 124 by transmitting a hypergraph representation of one or more dialogs over network 114 to client device 104 so as to instantiate or provision the interactive visualization tool 144 on the client device 104. The interactive visualization tools 124 and 144 may take the form of applications running on dialog visualization system 102 and client device 104, respectively.

As mentioned above, the dialog visualization system 102 includes dialog analysis model 120, hypergraph visualization module 122 and interactive visualization tool 124. The functionality provided by these components will be discussed in detail below.

The dialog analysis module 120 is configured to receive at least one dialog, possibly from one or more of the dialog source(s) 106 or the dialog repository 108. The dialog source(s) 106 may be varied. For example, the dialog source(s) 106 may include online forums or threads, bulletin board conversations, email conversations, text message or other chat application conversations, meeting minutes, video or audio recordings, phone call summaries or transcripts, etc. In some cases, a single dialog or conversation may include information from multiple dialog sources. For example, a conversation or dialog may include a transcript of a phone call as well as meeting minutes, or a combination of email messages and chat conversations from one or more chat applications or systems. A single dialog may also be comprised of multiple different conversations or dialog portions that are spread across time. For example, two different phone call transcripts or text message conversations that take place days, weeks or months apart may be combined to form a single dialog.

After receiving at least one dialog, the dialog analysis module 120 can perform a number of tasks including analyzing the dialog to identify topics and contributions by persons to the topics and tracking evolution of the identified topics over time in the dialog.

Analyzing the dialog may, in some embodiments, utilize a combination of topic modeling and sentiment analysis. Topic modeling may use, by way of example, supervised Latent Dirichlet allocation (SLDA) modeling while sentiment analysis may use, by way of example, Aspect and Sentiment Unification Model (ASUM). In some embodiments, identifying the topics in the dialog utilizes sentiment analysis in addition to topic classification so as to identify decisions in the dialog. Consider, by way of example, the following message: "I think Company A will be a good bet to invest in for the coming decades." Apart from identifying the topic in this message, Company A, it can be useful to understand that the speaker or author of the message spoke in favor of the topic, calling it a "good bet." Sentiment analysis provides this context and is useful for identifying that a decision has been made.

Figure 2:
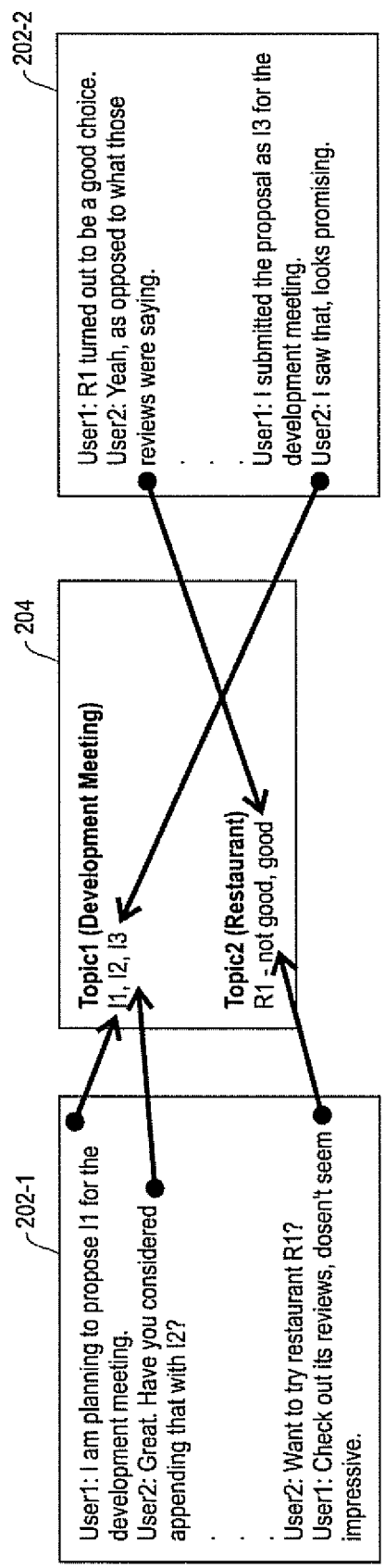
FIG. 2 depicts an example of topic identification from dialog, according to an exemplary embodiment of the present invention.

Latent Dirichlet allocation (LDA) or other topic modeling may be used to identify topics that do not have any connections with other topics. Once such complete disjoint classification is completed, all sub-topics may be considered for decisions. In some embodiments, only those sub-topics which tend to repeat (incrementally) and have sentiment attached thereto may be considered for decisions. FIG. 2 depicts an example of topic identification from chat snippets of interest. Ideas in the figure, denoted I1, I2 and I3, are the subset of topics inside a disjoint topic cluster. These ideas help a certain topic evolve over time. Blocks 202-1 and 202-2 in FIG. 2 show dialog sources, in this example, two chat snippets. Block 204 in FIG. 2 shows the evolution of two topics, denoted Topic1 and Topic2, over time in the chat snippets 202-1 and 202-2. As shown, Topic1 (Development Meeting) evolved from idea I1 to I2 to I3 over time. Topic2 (Restaurant) shows that the restaurant R1 evolved from a "not good" sentiment to a "good" sentiment over time.

In some embodiments, the dialog analysis module 120 utilizes ASUM to identify the ideas and how their corresponding sentiments are expressed in conversation snippets. SLDA can outperform LDA in identifying aspects. A similar generative model can be used to identify ideas, wherein each idea can be considered as an aspect of a larger topic. Similar to ASUM, an unsupervised model may be used to identify general affective and evaluative words in dialog. At the same time, some embodiments may identify idea-specific evaluative words without any unlabeled data. Using SLDA and ASUM together, the dialog analysis module 120 can identify ideas and corresponding sentiments expressed in chat snippets or other portions of a dialog in an unsupervised manner.

Tracking evolution of the identified topics over time may be based on a number of parameters. In some embodiments, the dialog analysis module 120 utilizes linguistic distance (LD), temporal distance (TD) and personal distance (PD) for modeling evolution of ideas or topics in dialog.

LD measures drift in topics or sentiments expressed in respective portions of a dialog. LD corresponds to the drift in topic or sentiment expressed in chat snippets or other portions of dialog. Identification provides topic sentences and idea specific evaluative words. Kullback-Leibler divergence or cosine similarity are two possible techniques which may be used to measure LD. In other embodiments, various other techniques may be used to measure LD. A higher LD corresponds to a higher likelihood of idea or topic evolution.

TD measures time difference between different portions of a dialog. For example, TD may be the time difference between two chat snippets. Generally, similar ideas are expressed at a shorter TD. Thus, if two chat snippets or other portions of a dialog are separated by a larger TD, the chat snippets or portions of the dialog are more likely to be modified or represent idea or topic evolution.

PD measures a distance between communicating persons for respective portions of a dialog. The distance between communicating persons may be obtained from an employee or personal hierarchy, which may be obtained from personnel database(s) 110. For example, within an organization or entity persons may be organized in different groups or divisions, each having different supervisory roles and subordinate roles. PD may be shorter for two persons in the same group or division, or in a same class such as two managers or supervisors. PD may be longer when two persons are in different groups or divisions, or have different classes. In other embodiments, PD may incorporate or be based at least in part on similarities among the communications modes that are used by different persons to participate in the dialog. Examples of such communication modes include, but are not limited to, computers, tablets, watches, smartphones, devices which are accessible over the Internet such as Internet of Things (IoT) devices, etc. In this sense, PD may be measured in terms of the communication network.

Tracking evolution of identified topics, sub-topics or ideas over time may include utilizing penalty computations based on LD, TD and PD. The penalty computations may identify evolution between and within respective ones of the topics, sub-topics or ideas. Equation (1) below shows an example of a penalty computation which may be utilized by dialog analysis module 120 in some embodiments:

$$\text{Penalty} = (\omega_{LD} * LD) + (\omega_{TD} * TD) + (\omega_{PD} * PD) \quad (1)$$

wherein $\omega_{LD}$, $\omega_{TD}$, and $\omega_{PD}$ represent weights for LD, TD and PD, respectively. The penalty may be computed for pairs of topics sentences. If the penalty reaches a threshold, the two topic sentences are determined to belong to different ideas. In this way, evolution of topics is identified and tracked. Edges may be created between topics, sub-topics or ideas. Each edge is considered as a node, and each edge may be annotated with different attributes such as time-stamps, participants, sentiment values, etc. The edges, and the data generally, may be represented in one or more hypergraphs, as will be discussed in further detail below in conjunction with FIGS. 3 and 4.

Information from dialog repository 108, personnel database(s) 110 and topics and ideas database(s) 112 may be used for topic modeling and sentiment analysis as well as penalty computation. The dialog repository 108, for example, may contain previously summarized dialogs used as training data for SLDA or ASUM. The personnel database(s) 110 may be used to identify participants in a dialog as well as the roles of such participants within an organization or entity. Topics and ideas database(s) 112 may include previously identified topics, sub-topics and ideas, or relational tables mapping keywords to topics, sub-topics or ideas to use as training data for SLDA, ASUM and/or penalty computation.

Simple hierarchy-based tree visualization of dialogs may not be sufficient to model the complex interactions that happen as ideas are shaped and evolve over time, with various decisions being made in the course of a conversation. Time intermissions between portions of dialog add to this complexity. As a result, some embodiments utilize hypergraph representations of dialog, which provide various advantages discussed below.

The hypergraph visualization module 122 utilizes identified topics, sub-topics and ideas, as well as the identified contributions of persons to the topics, sub-topics and ideas and tracked evolution of the topics, sub-topics and ideas to generate a hypergraph representation of dialog. The hypergraph representation includes a plurality of nodes corresponding to respective ones of the persons contributing to the identified topics, as well as a plurality of hypergraph edges. Each hypergraph edge connects at least two nodes, or at least two of the contributing persons, for a corresponding one of the identified topics. Also, a hypergraph edge may connect more than two nodes. For example, in some cases three or more persons may contribute to a particular idea or topics. As such, a hypergraph edge for the idea or topic may connect three nodes, one for each contributing person.

In some embodiments, each hypergraph edge is associated with one or more attributes. Such attributes include, by way of example, a time-stamp and/or a sentiment value. One or more nodes in the hypergraph may also be associated with one or more attributes in some embodiments. Examples of node attributes include, but are not limited to, a name, one or more areas of interest, position within an organization or entity, etc. The node attributes may be utilized to weight contributions of the person corresponding to that node for different topics. For example, the contribution of a first person with an area of interest corresponding to a given topic may be given more weight than the contribution of a second person not having an area of interest corresponding to the given topic. As another example, the weight assigned to a contribution from a manager or supervisor may be given more weight than contributions from employees below the manager or supervisor in an organizational hierarchy.

Figure 3:
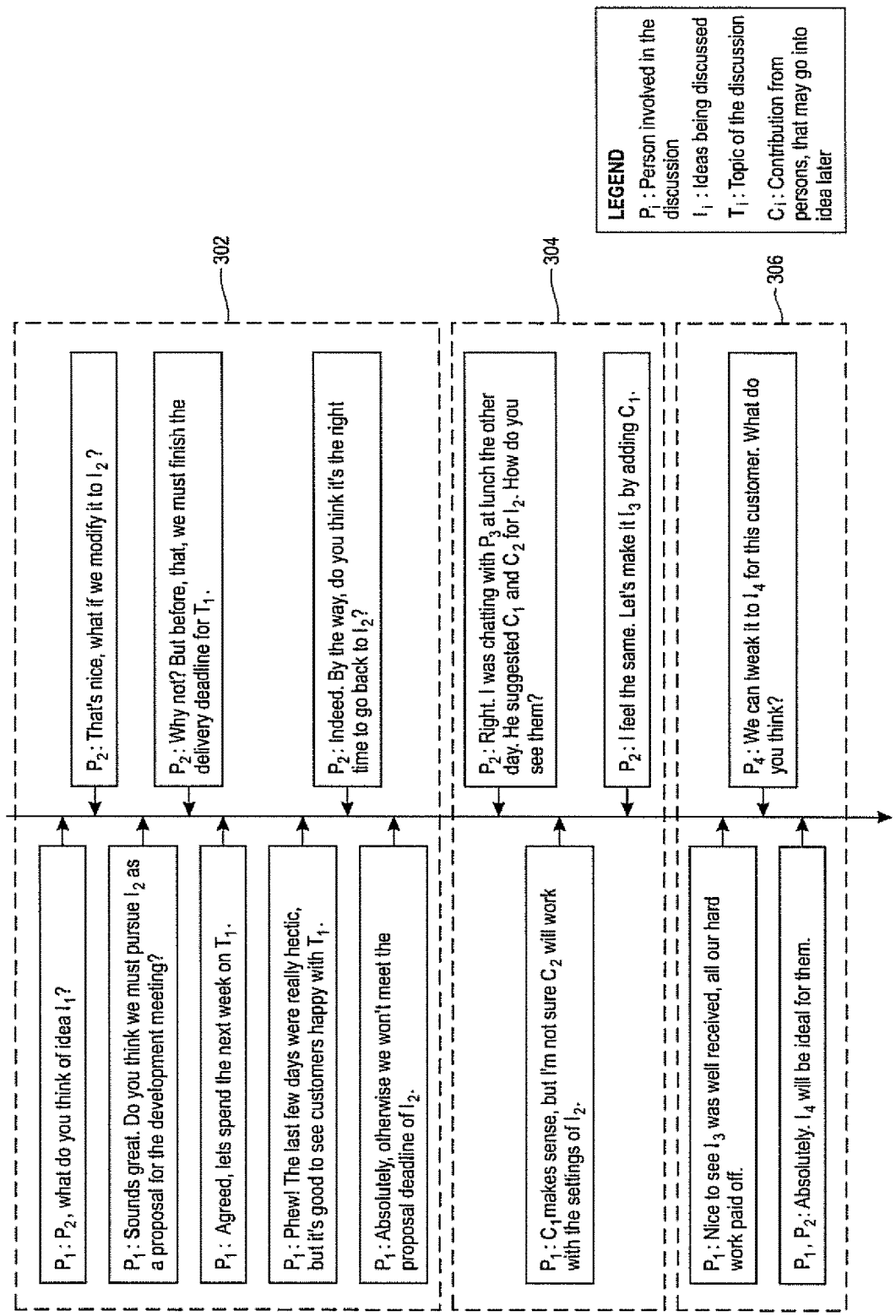
FIG. 3 depicts an example of dialog with multiple participants and topics, according to an exemplary embodiment of the present invention.

FIG. 3 depicts an example of dialog with multiple participants and topics. As shown in the legend of FIG. 3, certain variables are used to represent the persons involved in a discussion ($P_i$), ideas being discussed ($I_i$), topics of the discussion ($T_i$), and contributions from persons ($C_i$). FIG. 3 shows dashed lines around three portions of the dialog 302, 304 and 306. Hypergraph visualization module 122 may be used to generate the hypergraph representations shown in FIG. 4 after the FIG. 3 dialog is analyzed using dialog analysis module 120. Generation of a hypergraph representation of the FIG. 3 dialog will be shown in stages in FIGS. 4A-4C, taking into account the portions 302, 304 and 306.

Figure 4A:
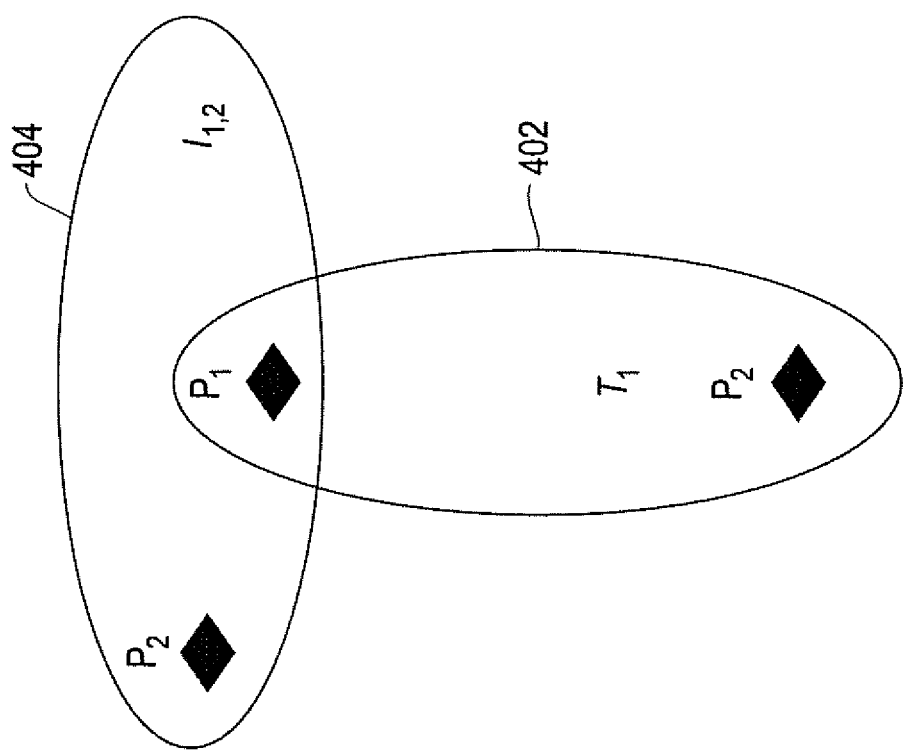
FIGS. 4A-4C depict generating of a hypergraph representation of the FIG. 3 dialog, according to an exemplary embodiment of the present invention.

FIG. 4A depicts construction or generation of hypergraph edges 402 and 404 based on portion 302 of the FIG. 3 dialog. Both of the hypergraph edges 402 and 404 connect $P_1$ and $P_2$, but on two disjoint topics. Hypergraph edge 402 corresponds to topic $T_1$, which is contributed to by persons $P_1$ and $P_2$. This is shown in portion 302 of the dialog, where $P_1$ and $P_2$ discuss meeting the proposal deadline for $T_1$. Hypergraph edge 404 corresponds to ideas $I_1$ and $I_2$, which are contributed to by $P_1$ and $P_2$. This is shown in portion 302 of the dialog, wherein $P_1$ asks for $P_2$'s feedback regarding $I_1$, and $P_2$ proposes modifying $I_1$ to $I_2$. As will be shown in FIGS. 4B and 4C, $I_1$ and $I_2$ evolve further with additional contributions from $P_1$ and $P_2$ as well as additional persons $P_3$ and $P_4$ in portions 304 and 306 of the FIG. 3 dialog.

Figure 4B:
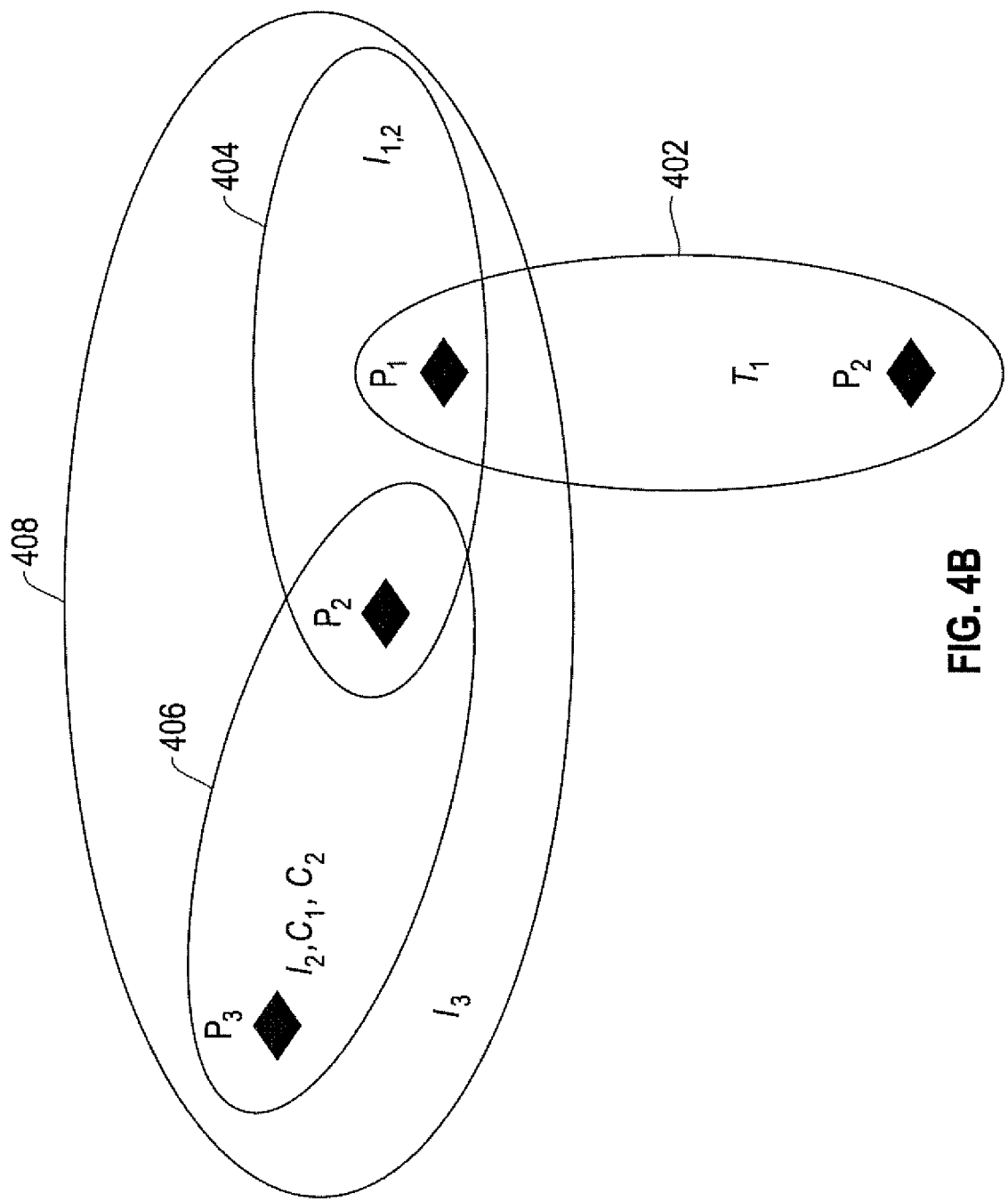

FIG. 4B shows the construction of two additional hypergraph edges, 406 and 408, based on portion 304 of the FIG. 3 dialog. Hypergraph edge 406 connects $P_2$ and $P_3$ for topic $I_2$ and contributions $C_1$ and $C_2$. This is based on $P_2$'s message regarding a chat with $P_3$ at lunch regarding suggestions $C_1$ and $C_2$ for $I_2$. Hypergraph edge 406 illustrates how a person does not necessarily need to be an active participant in a particular dialog but nonetheless may be included in the hypergraph representation of the dialog and decisions made. In this example, the dialog source (FIG. 3) does not contain any message from $P_3$ directly, but instead identifies $P_3$'s contributions to $I_2$ inferentially based on a message from $P_2$. Hypergraph edge 408 connects $P_1$, $P_2$ and $P_3$ for $I_3$, an evolution of $I_2$. As shown in portion 304 of the FIG. 3 dialog, $P_1$ and $P_2$ discuss $C_1$ and $C_2$, and decided to evolve $I_2$ to $I_3$ by adding $C_1$. $P_3$, the source of $C_1$, is also included in hypergraph edge 408.

Figure 4C:
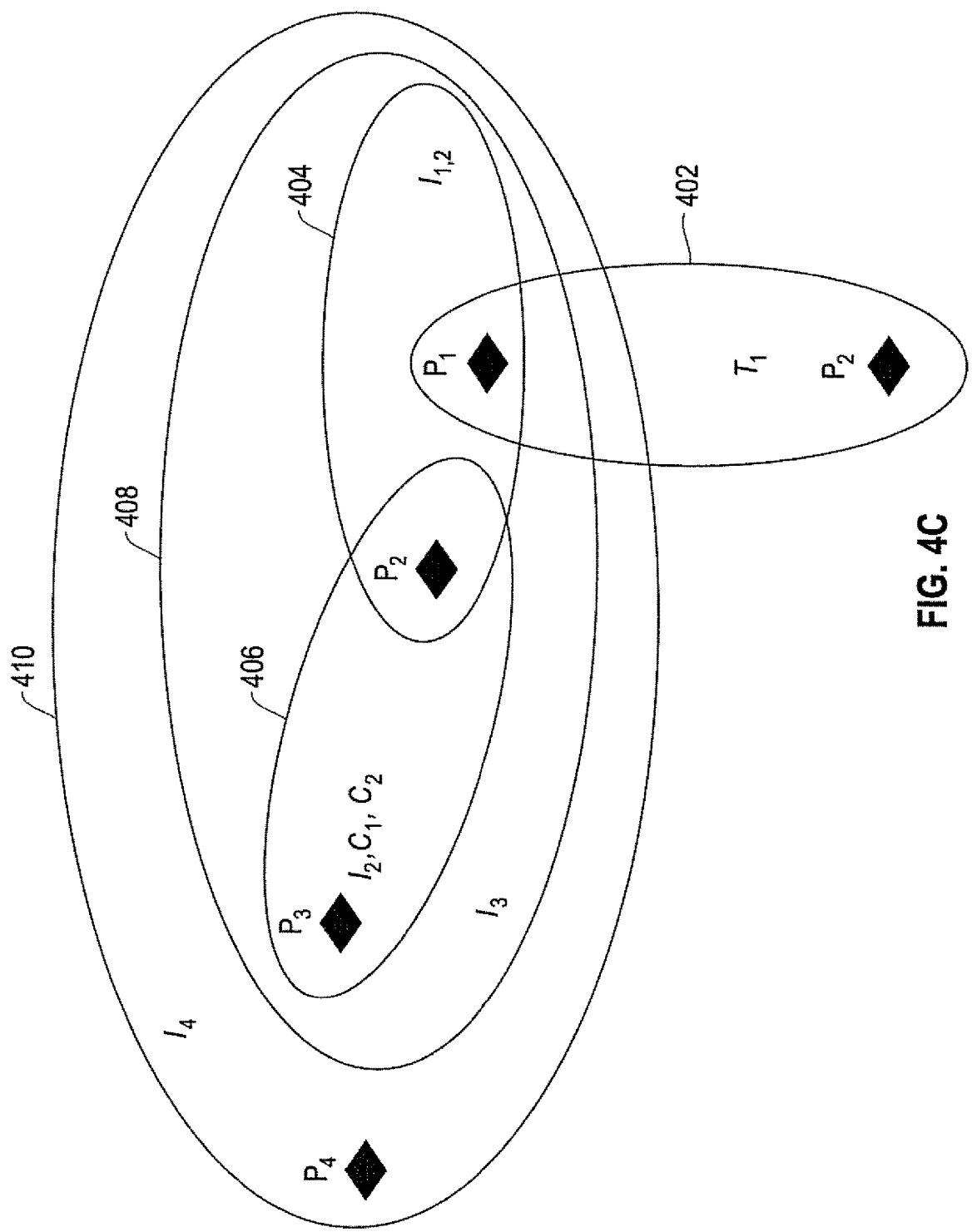

FIG. 4C shows the construction of hypergraph edge 410 based on portion 306 of the FIG. 3 dialog. Hypergraph edge 408 connects $P_1$, $P_2$, $P_3$ and $P_4$ for idea $I_4$, an evolution of $I_3$. This is shown in portion 306 of the FIG. 3 dialog, where $P_4$ suggests tweaking $I_3$ to $I_4$ for a particular customer.

The example hypergraph representations in FIGS. 4A-4C illustrate a number of advantages relating to the use of hypergraphs. For example, hypergraph edges can connect more than two nodes. Given a specific idea, a hypergraph may be used to model the persons contributing to that idea.

In the FIG. 4 example, idea $I_3$ involved contributions from P1, P2 and P3. Forming hypergraph edge 408 is a holistic approach to capturing such contributions. Hypergraphs also illustrate how interactions happened. The common vertex $P_2$ between the hypergraph edge 404 for ideas $I_1$, $I_2$ and hypergraph edge 406 for idea $I_2$ and contributions $C_1$ and $C_2$ denote that $P_2$ communicated with $P_1$ and $P_3$ individually for idea $I_3$. The hypergraph edge 408 for idea $I_3$ captures this by including nodes for $P_1$, $P_2$ and $P_3$.

In addition to the advantages associated with hypergraph edges, hypergraph representations provide a number of advantages for operating at the graph level. Sub-graph containment, for example, is useful for visualizing how ideas, sub-topics or topics evolved over time. Sub-graph containment can be exploited to identify idea evolution. In the context of the FIG. 4 example, the sub-graph shown in FIG. 4B illustrates that idea $I_3$ evolved from $I_1$ and $I_2$, as hypergraph edge 408 for idea $I_3$ contains hypergraph edges 404 and 406 for ideas $I_1$ and $I_2$. In contrast, topic $T_1$ is not contained by $I_3$ as shown by hypergraph edge 402 not being contained within hypergraph edge 408. This illustrates that topic $T_1$ and idea $I_3$ evolved independently.

Operating at the graph level also provides advantages for identifying how persons or nodes are connected. In the FIG. 4 example, although $P_1$ and $P_3$ never interacted directly they are connected by hypergraph edge 408 for idea $I_3$, thus illustrating that $P_1$ and $P_2$ have an area of interest match. On the other hand, the nodes for $P_1$ and $P_2$ are connected by many hypergraph edges in the FIG. 4 example denoting that $P_1$ and $P_2$ share very overlapping areas of interest matches.

Hypergraph representations also provide various advantages for visualization. As an example, hypergraph representations allow for straight mapping to restrictive visualizations by selecting only a single hypergraph edge of interest, or selecting only a subset of hypergraph edges of interest. Each hypergraph edge may be selected so as to present a timeline showing how an idea evolved with inputs from different nodes at particular times. In the FIG. 4 example, if the hypergraph edge 408 is selected, the timeframe involving hypergraph edge 408 along with hypergraph edges 404 and 406 will be shown. The hypergraph edges 402 and 410, however, would not be shown in the summary of hypergraph edge 408 as such edges are irrelevant in the timeline of hypergraph edge 408, e.g., hypergraph edges 402 and 410 are not wholly contained within hypergraph edge 408. The hypergraph representation also allows for selectively viewing portions of the hypergraph to present a quick summary of a larger dialog by stretching selected hypergraph edges and nodes forward or backward in time.

As mentioned above, hypergraph nodes may be associated with one or more attributes. Such attributes may also be used to customize visualizations based on the hypergraph representation. As an example, the nodes for different participants in the FIG. 4 hypergraph may be associated with attributes such as name, areas of interest, position within an organization, etc. Such attributes may be used to weight the contributions or opinions of that participant for particular topics. These attributes may also be used to filter the hypergraph. For example, the hypergraph representation may be altered to show only hypergraph edges corresponding to a particular participant's area(s) of interest, or only hypergraph edges between participants at certain levels of an organization such as only hypergraph edges between participants that are managers or members of a same team, group, or division. This can allow for visualization of the effectiveness or contributions of a particular team, group or division within an organization or entity, or to compare different teams, groups or divisions. For example, if a first team in an entity has a relatively large hypergraph edge count while a second team has a relatively small hypergraph edge count, this may be used to evaluate which team or members thereof should be candidates for rewards, bonuses or promotions, or which team or members thereof should receive additional training or be candidates for reassignment within the entity.

In some embodiments, hypergraph edges and nodes or node attributes may be selected. For example, in some cases, a project for an entity may involve a number of disparate groups, teams or other individuals within that entity. To see how the different teams, groups or other individuals contributed to a particular project, hypergraph edges corresponding to that project or topics, sub-topics or ideas relating to that project may be selected along with nodes corresponding to different groups, teams or individuals within the entity. This can allow for visualizing the relative contributions of the groups, teams or individuals to a particular project. Various other examples are possible.

Various other visualization features provided by hypergraph representations will be discussed in detail below in conjunction with the discussion of interactive visualization tool 124. The interactive visualization tool 124 and interactive visualization tool 144 include various interface features. The interface features may be used to customize the hypergraph representation or a view thereof based on the needs of a particular user. In some embodiments, one or more of the interface features may be restricted based on a current user of the interactive visualization tool 124 or 144. The user of interactive visualization tool 124 or 144 may be required to log in or authenticate before being allowed access to different features of the interactive visualization tool 124 or 144.

Consider, for example, a first user whose role within the organization is at the bottom of a hierarchy. The first user's access to interface features may be limited relative to the first user's superiors or managers. As an example, the first user may be able to customize the hypergraph representation to view hypergraph edges to which he or she has contributed, but may not be able to view hypergraph edges for which the first user is not a contributor. As another example, the first user may be able to view hypergraph edges corresponding only to his or her areas of interest while the first user's superiors or managers may be able to view hypergraph edges for all areas of interest, or for any area of interest for any user in a lower level of an organizational hierarchy. For instance, the supervisor of a team including members A, B and C may be able to view hypergraph edges for any topic, sub-topic or idea for which any of members A, B or C is a contributor, or hypergraph edges for any topic, sub-topic or idea for which any of members A, B or C has an area of interest. It is to be appreciated that embodiments of the invention are not limited to the particular examples described above. Instead, access to various interface features of interactive visualization tool 124 or 144 may be restricted in a number of different ways.

As mentioned above, the interactive visualization tool 124 or 144 may include a number of different interface features. Examples of such interface features are described below, although it should be appreciated that embodiments are not limited solely to use with the specific interface features mentioned below. Various other types of interface features may be provided in other embodiments, including combinations of the interface features described below and elsewhere herein.

The interactive visualization tool 124 or 144 may provide a tracking interface feature, allowing for tracking evolution of a given topic utilizing subgraph containment in a hypergraph representation of a dialog. Although described in this context as tracking evolution of a topic, interface features may also be provided for tracking evolutions of sub-topics or ideas within a topic. The tracking interface feature may allow for selection of one or more hypergraph edges in the hypergraph representation so as to present a timeline showing evolution of the topics associated with the selected hypergraph edges along with one or more other hypergraph edges contained within the selected hypergraph edges.

The interactive visualization tool 124 or 144 may also provide a connection interface feature, allowing for identification of connections between persons or participants in a dialog utilizing hypergraph edge counts. As an example, the connection interface feature may allow for selection of a particular node or nodes in the hypergraph representation and show a count of the number of hypergraph edges to which that node or nodes is or are contributors. The connection interface feature may also allow for selection of a particular node or nodes as well as particular topics, sub-topics or ideas to show a count of the hypergraph edges in common between the selected node or nodes and the selected topics, sub-topics or ideas.

The interactive visualization tool 124 or 144 may also provide one or more show/hide interface features, permitting a user to selectively display hypergraph edges or nodes in the hypergraph representation. As an example, a user may wish to view only a portion of the hypergraph for a particular topic, sub-topic or idea. As another example, a user may wish to view only a portion of the hypergraph for a subset of participants or contributors. Show/hide interface features allow for customization of a view of the hypergraph representation based on user selection of topics, sub-topics, ideas, participants or nodes. This may involve selection of hypergraph edges or nodes, or particular attributes thereof.

The interactive visualization tool 124 or 144 may also provide a path interface feature, allowing for path-finding in a hypergraph representation of a dialog. In some embodiments, path-finding may include weighted path-finding. Examples of path-finding and weighted path-finding techniques include, but are not limited to, static shortest path algorithms, dynamic shortest path or hyperpath algorithms including hyperedge based dynamic shortest path algorithms and dimension reduction based dynamic shortest path algorithms, etc.

Figure 5:
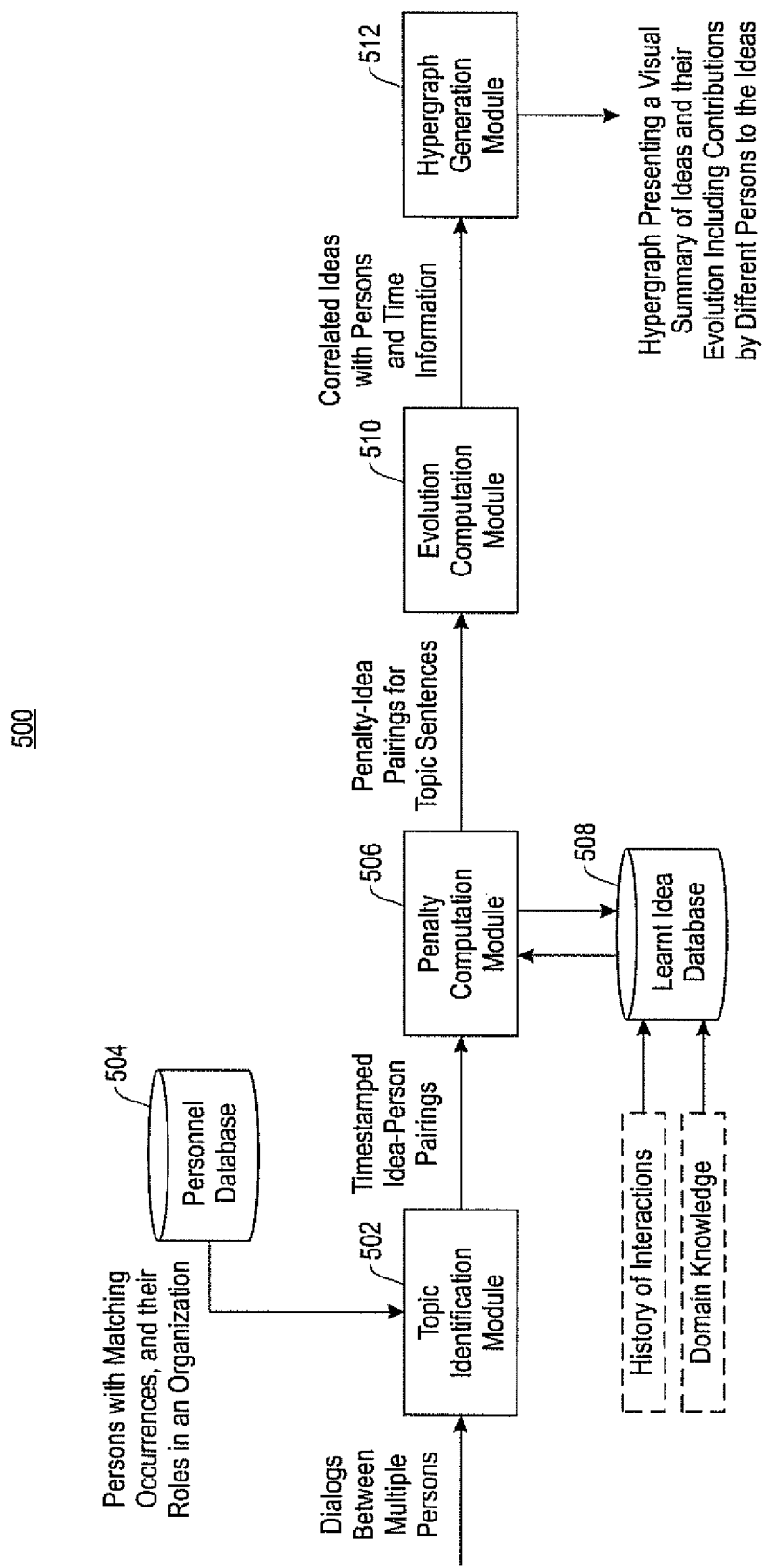
FIG. 5 depicts another system for generating hypergraph representations of dialog, according to an exemplary embodiment of the present invention.

FIG. 5 depicts a system 500 for generating hypergraph representations of dialog. The system 500 includes a topic identification module 502, which receives dialogs between multiple persons or participants. The topic identification module 502 also receives information from personnel database 504. The information from personnel database 504 may match persons in the database with matching occurrences in the dialog, as well as providing information on such matched persons or participants with their roles in an organization or entity.

The topic identification module 502 provides to penalty computation module 506 time-stamped idea-person pairings. The penalty computation module 506 receives from learnt idea database 508 a number of topic sentences. The topic sentences may be incorporated into learnt idea database 508 based on a history of interactions from previous dialogs as well as domain knowledge.

The penalty computation module 506 calculates penalty-idea pairings or topic sentences, which are provided to evolution computation module 510. The evolution computation module 510 correlates ideas with persons or participants as well as timing information. Such correlations are provided from the evolution computation module 510 to hypergraph generation module 512, which generates a hypergraph presenting a visual summary of ideas and their evolution including contributions by different persons or participants to the ideas.

Figure 6:
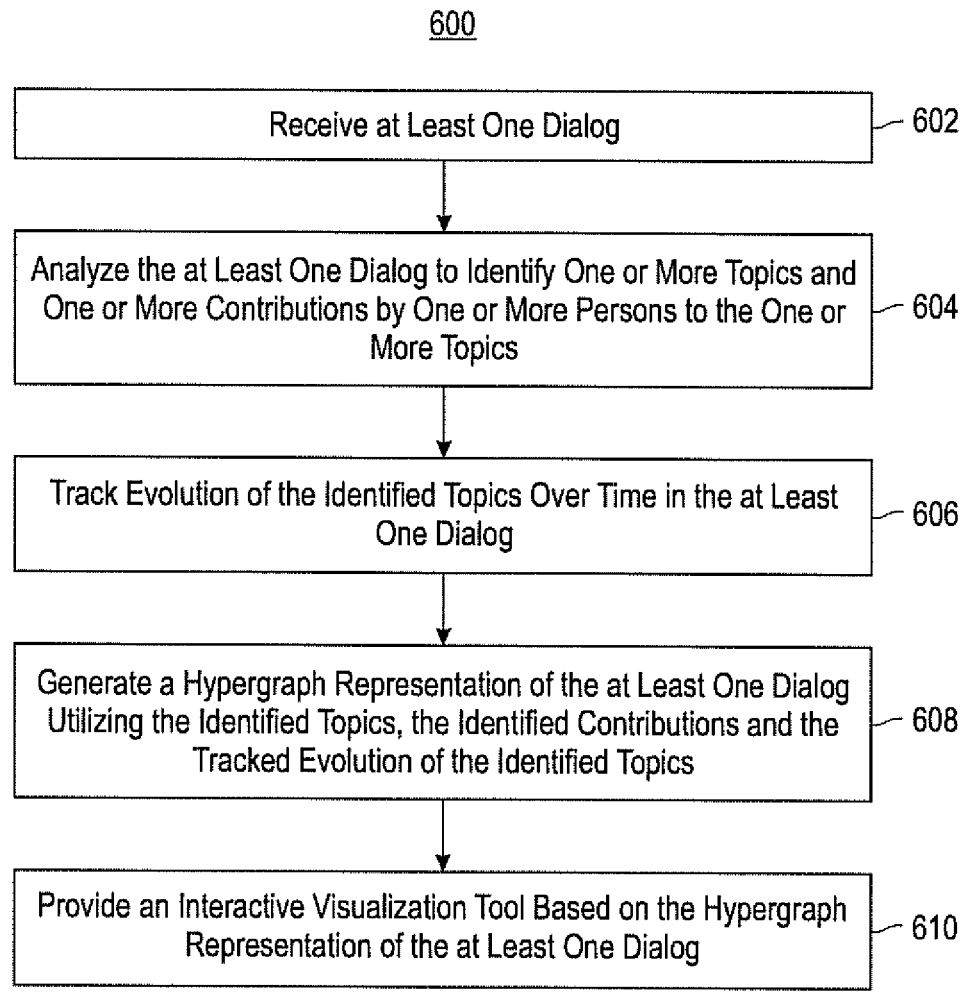
FIG. 6 depicts a process for generating hypergraph representations of dialog, according to an exemplary embodiment of the present invention.

FIG. 6 depicts a process 600 for generating hypergraph representations of dialog. Process 600 begins with step 602, receiving at least one dialog. In step 604, the at least one dialog is analyzed to identify one or more topics and one or more contributions by one or more persons to the one or more topics. Evolution of the identified topics is tracked over time in the at least one dialog in step 606. A hypergraph representation of the at least one dialog is generated in step 608 utilizing the identified topics, the identified contributions and the tracked evolution of the identified topics. In step 610, an interactive visualization tool is provided based on the hypergraph representation of the at least one dialog.

Embodiments may be used for a variety of different applications. Examples of such applications are described below, along with various advantages provided by some embodiments. It is to be appreciated, however, that embodiments may be used in various other applications and contexts and that certain embodiments may provide some, all or none of the specific advantages listed below or elsewhere herein.

For example, the Watson Dialog System (WDS) is a useful tool for accessing the IBM Watson® system. If WDS supports group chat, DBS (Watson Clients) Relation Managers (RMs) can interact with Watson to obtain an outlook of interested entities, discuss investment pros and cons, etc. Such a discussion may be lengthy, with multiple entities, topics and opinions expressed by different participants. It may be useful to capture a summary of such discussions using hypergraph representations as described herein, and to provide an interactive visualization tool such as interactive visualization tool 124 or 144 for analyzing the summary of such discussions.

Many online collaborative forums are used to address technical and social problems. Examples of such online forums include Stack Overflow®, IBM Community Forums, etc. Such online forums provide platforms for users to post queries, invite participants and collaborate and evolve solutions. Hypergraph representations, as described herein, may be used to capture candidate ideas and their evolution over time, and interactive visualization tools such as interactive visualization tool 124 or 144 may be used for analyzing the evolution of the candidate ideas.

Another application area involves information technology (IT) services, including, by way of example, incident ticket and change ticket resolution. In some cases, similar issues or incident tickets may arise. Resolve notes may be incremental changes for similar issues or incident tickets from a same resolve group, but from different resolvers. Consider, by way of example, a repeated incident "Z_RTR_AR_LOAD process chain failed." The resolve notes for various instances of this incident may vary or incrementally change, by way of example, from "Repeat the roll-up step once," to "Repeat the roll-up step once after running it manually once," to "Run the roll-up step manually and after it completes, repeat the step from process chain," to "Repeat the roll-up step in previous run and after it is successful, repeat the present run delete index step once." Such incremental resolution steps can be difficult to track with conventional solutions. Communication within a team or resolver group to refine the solution can be captured efficiently using hypergraph representations as described herein. Users can analyze how the solution was refined using an interactive visualization tool such as interactive visualization tool 124 or 144.

In some embodiments, hypergraph representations can be used to represent multi-threaded chat or dialog summaries as a graph with topics as nodes and directed edges representing the flow of topics. Sentiment polarity and key participants are details that can be displayed on top of the nodes, along with transition messages on the top of edges in the hypergraph representation. In other embodiments, nodes can be interchanged with participants instead of topics. The nodes may be annotated with overall sentiment polarity expressed by a user or participant across topics and edges connecting to interacted participants so as to provide a summary of participant interaction in a chat thread or other dialog.

Hypergraph representations of a dialog provide various advantages relative to other solutions. For example, a tree representation of a dialog is a minimally connected graph which can capture only one path between any two vertices. In many dialogs, however, there may be multiple paths. Hypergraph representations with directional edges thus provide a better interface for capturing the flow of a dialog relative to tree structures. The directions of hypergraph edges can encode richer, more fine-grained semantics relative to non-directed hypergraph edges. As an example, directional hypergraph edges may be used to indicate whether particular participants only consume information from an ongoing discussion or whether particular participants contribute back to the ongoing discussion in addition to or in place of consuming information from the ongoing discussion. As another example, directional hypergraph edges may be used to indicate the flow of messages or evolution of topics over time. In addition, the use of topics with sentiment analysis provides various advantages in understanding the consensus between participants and the evolution of topics, sub-topics and ideas in a dialog.

Embodiments of the present invention can include be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
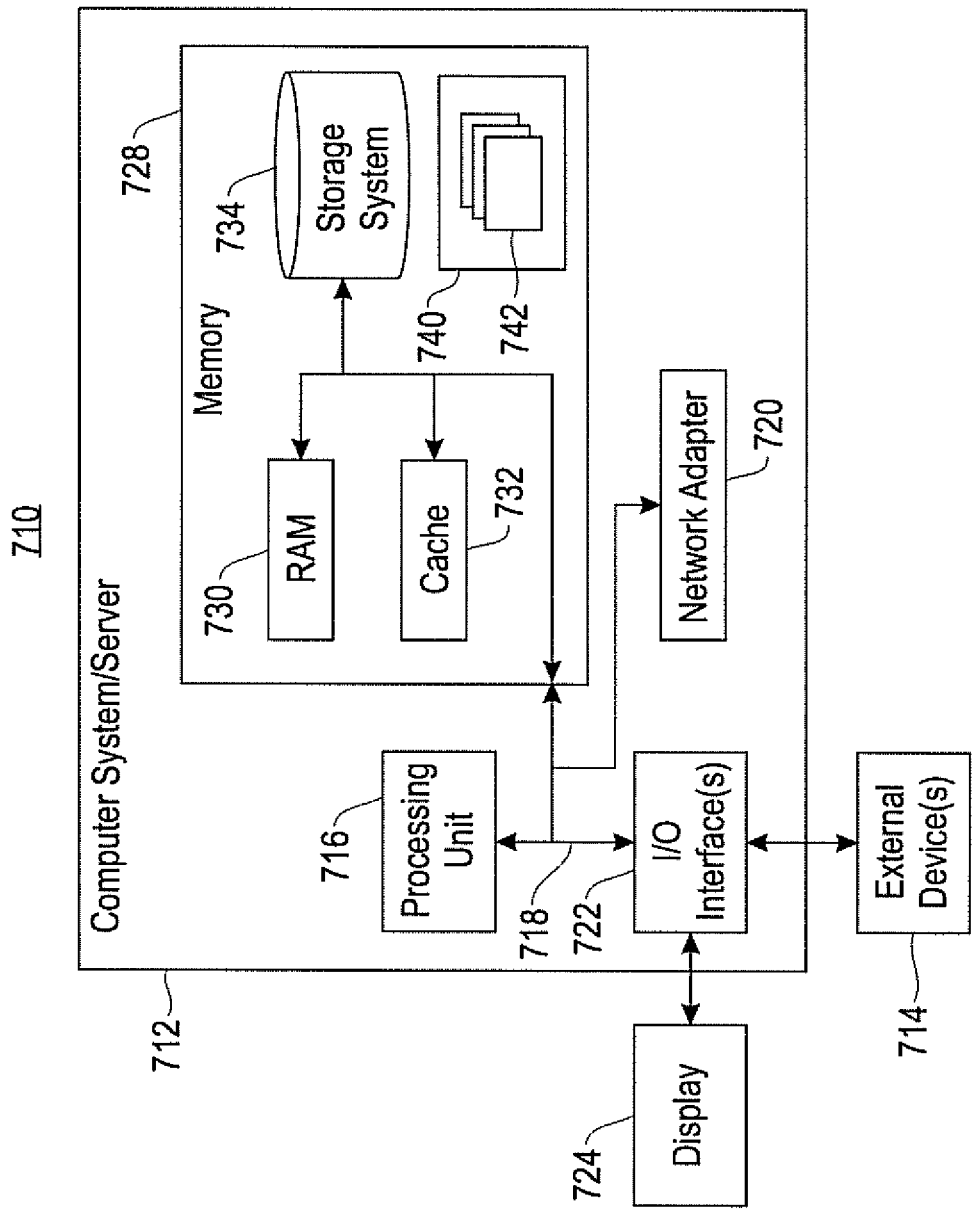
FIG. 7 depicts a computer system in accordance with which one or more components/steps of techniques of the invention may be implemented, according to an exemplary embodiment of the invention.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a LAN, a general WAN, and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
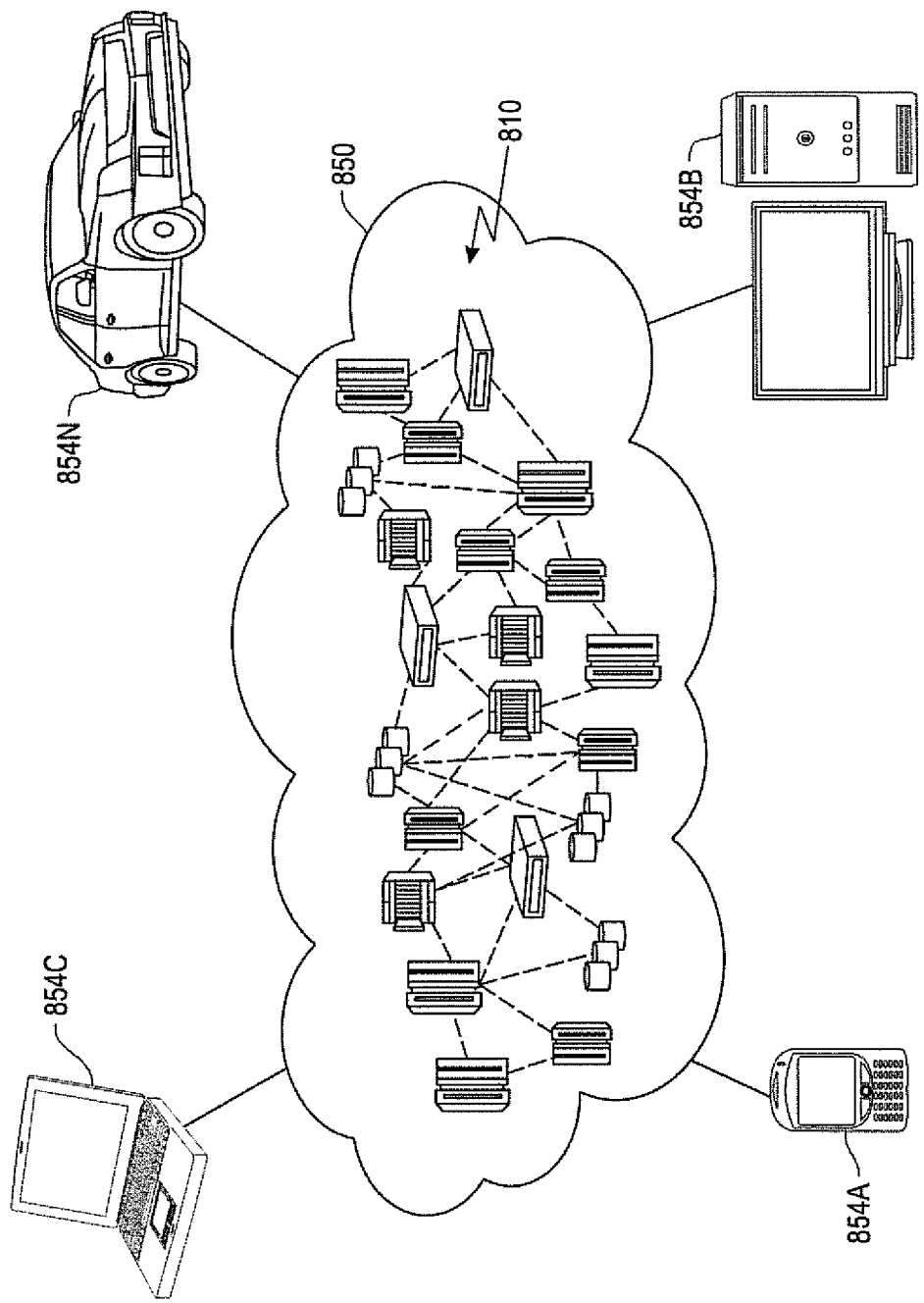
FIG. 8 depicts a cloud computing environment, according to an exemplary embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
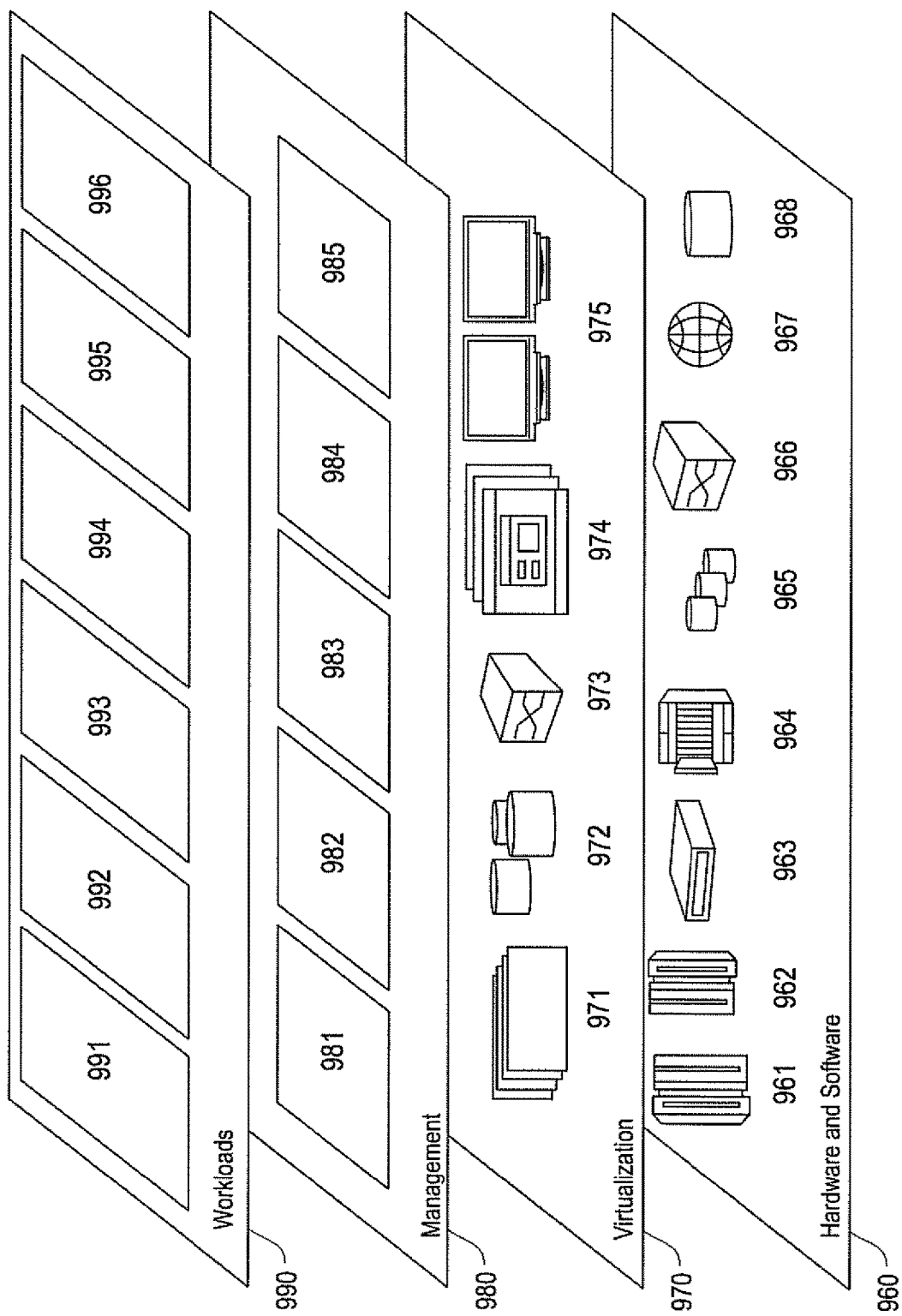
FIG. 9 depicts abstraction model layers, according to an exemplary embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and hypergraph generation processing 996, which may perform various functions described above with respect to system 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising steps of:
analyzing at least one dialog to identify (i) one or more topics and (ii) one or more contributions by one or more persons to the one or more topics;
tracking evolution of the identified topics over time in said at least one dialog;
generating a hypergraph representation of said at least one dialog utilizing (i) the identified topics, (ii) the identified contributions and (iii) the tracked evolution of the identified topics, wherein the hypergraph representation comprises (i) a plurality of nodes corresponding to respective ones of the persons contributing to the identified topics and (ii) a plurality of hypergraph edges, wherein each hypergraph edge is associated with a given one of the identified topics and connects at least two of the nodes, wherein each of the plurality of nodes is associated with multiple attributes, the multiple attributes comprising (i) a name, (ii) one or more areas of interest and (iii) a position within an organization, and wherein the multiple attributes associated with a given node are utilized to weight contributions of the person corresponding to the given node for one or more topics; and providing an interactive visualization tool based on the hypergraph representation of said at least one dialog, wherein the interactive visualization tool comprises at least one interface feature for tracking evolution of a given topic utilizing subgraph containment in the hypergraph representation, and wherein the at least one interface feature for tracking evolution of a given topic permits selection of a given hypergraph edge to present a timeline showing the evolution of the given topic, with inputs from different nodes at particular times, associated with (i) the given hypergraph edge and (ii) one or more other hypergraph edges contained within the given hypergraph edge, and wherein the interactive visualization tool comprises at least one interface feature for identifying one or more connections between given persons participating in the dialog utilizing hypergraph edge counts pertaining to the number of hypergraph edges to which the nodes corresponding to the given persons are contributors;

wherein the steps are carried out by at least one computing device.

2. The computer-implemented method of claim 1, wherein at least one of the hypergraph edges connects at least three of the nodes.

3. The computer-implemented method of claim 1, wherein each of the hypergraph edges is associated with one or more attributes, the one or more attributes comprising (i) a time-stamp and (ii) a sentiment value.

4. The computer-implemented method of claim 1, wherein providing the interactive visualization tool comprises transmitting the hypergraph representation over at least one network to a client device associated with a user to instantiate the interactive visualization tool on the client device.

5. The computer-implemented method of claim 1, wherein the interactive visualization tool comprises a plurality of interface features, wherein access to respective ones of the interface features is restricted based on the identity of a user of the interactive visualization tool.

6. The computer-implemented method of claim 1, wherein the interactive visualization tool comprises at least one interface feature for selectively displaying hypergraph edges of the hypergraph representation.

7. The computer-implemented method of claim 1, wherein the interactive visualization tool comprises at least one interface feature for path-finding in the hypergraph representation.

8. The computer-implemented method of claim 1, wherein said analyzing the at least one dialog comprises utilizing (i) topic modeling and (ii) sentiment analysis.

9. The computer-implemented method of claim 8, wherein the topic modeling utilizes supervised Latent Dirichlet allocation (SLDA) modeling and the sentiment analysis utilizes Aspect and Sentiment Unification Model (ASUM).

10. The computer-implemented method of claim 1, wherein said tracking the evolution of the identified topics over time is based on:

a linguistic distance measuring drift in topics and/or sentiments expressed in respective portions of the at least one dialog;

a temporal distance measuring a time difference between the portions of the at least one dialog; and a personal distance measuring a distance between communicating persons for the portions of the at least one dialog.

11. The computer-implemented method of claim 10, wherein said tracking the evolution of the identified topics over time comprises computing a penalty based on (i) the linguistic distance, (ii) the temporal distance and (iii) the personal distance to identify the evolution between and within respective ones of the identified topics.

12. A computer program product, the computer program product comprising a computer readable storage medium having program instructions embodied therewith, the program instructions executable by a device to cause the device to:

analyze at least one dialog to identify (i) one or more topics and (ii) one or more contributions by one or more persons to the one or more topics;

track evolution of the identified topics over time in said at least one dialog;

generate a hypergraph representation of said at least one dialog utilizing (i) the identified topics, (ii) the identified contributions and (iii) the tracked evolution of the identified topics, wherein the hypergraph representation comprises (i) a plurality of nodes corresponding to respective ones of the persons contributing to the identified topics and (ii) a plurality of hypergraph edges, wherein each hypergraph edge is associated with a given one of the identified topics and connects at least two of the nodes, wherein each of the plurality of nodes is associated with multiple attributes, the multiple attributes comprising (i) a name, (ii) one or more areas of interest and (iii) a position within an organization, and wherein the multiple attributes associated with a given node are utilized to weight contributions of the person corresponding to the given node for one or more topics; and provide an interactive visualization tool based on the hypergraph representation of said at least one dialog, wherein the interactive visualization tool comprises at least one interface feature for tracking evolution of a given topic utilizing subgraph containment in the hypergraph representation, and wherein the at least one interface feature for tracking evolution of a given topic permits selection of a given hypergraph edge to present a timeline showing the evolution of the given topic, with inputs from different nodes at particular times, associated with (i) the given hypergraph edge and (ii) one or more other hypergraph edges contained within the given hypergraph edge, and wherein the interactive visualization tool comprises at least one interface feature for identifying one or more connections between given persons participating in the dialog utilizing hypergraph edge counts pertaining to the number of hypergraph edges to which the nodes corresponding to the given persons are contributors.

13. A system comprising:

a memory; and at least one processor coupled to the memory and configured for:

analyzing at least one dialog to identify (i) one or more topics and (ii) one or more contributions by one or more persons to the one or more topics;

tracking evolution of the identified topics over time in said at least one dialog;

generating a hypergraph representation of said at least one dialog utilizing (i) the identified topics, (ii) the identified contributions and (iii) the tracked evolution of the identified topics, wherein the hypergraph representation comprises (i) a plurality of nodes corresponding to respective ones of the persons contributing to the identified topics and (ii) a plurality of hypergraph edges, wherein each hypergraph edge is associated with a given one of the identified topics and connects at least two of the nodes, wherein each of the plurality of nodes is associated with multiple attributes, the multiple attributes comprising (i) a name, (ii) one or more areas of interest and (iii) a position within an organization, and wherein the multiple attributes associated with a given node are utilized to weight contributions of the person corresponding to the given node for one or more topics; and providing an interactive visualization tool based on the hypergraph representation of said at least one dialog, wherein the interactive visualization tool comprises at least one interface feature for tracking evolution of a given topic utilizing subgraph containment in the hypergraph representation, and wherein the at least one interface feature for tracking evolution of a given topic permits selection of a given hypergraph edge to present a timeline showing the evolution of the given topic, with inputs from different nodes at particular times, associated with (i) the given hypergraph edge and (ii) one or more other hypergraph edges contained within the given hypergraph edge, and wherein the interactive visualization tool comprises at least one interface feature for identifying one or more connections between given persons participating in the dialog utilizing hypergraph edge counts pertaining to the number of hypergraph edges to which the nodes corresponding to the given persons are contributors.

14. A computer-implemented method, comprising steps of:

receiving at least one dialog;

analyzing said at least one dialog using (i) topic modeling and (ii) sentiment analysis to identify topics and sub-topics;

utilizing a penalty computation to track evolution of the identified topics and sub-topics over time in said at least one dialog;

generating a hypergraph representation of said at least one dialog based on the tracked evolution of the identified topics and sub-topics, wherein the hypergraph representation comprises (i) a plurality of nodes corresponding to persons contributing to the identified topics and sub-topics and (ii) a plurality of hypergraph edges, wherein each hypergraph edge is associated with a given one of the identified topics or sub-topics and connects at least two of the nodes, wherein each of the plurality of nodes is associated with multiple attributes, the multiple attributes comprising (i) a name, (ii) one or more areas of interest and (iii) a position within an organization, and wherein the multiple attributes associated with a given node are utilized to weight contributions of the person corresponding to the given node for one or more topics; and providing an interactive visualization tool based on the hypergraph representation of said at least one dialog, wherein the interactive visualization tool comprises at least one interface feature for tracking evolution of a given topic utilizing subgraph containment in the hypergraph representation, and wherein the at least one interface feature for tracking evolution of a given topic permits selection of a given hypergraph edge to present a timeline showing the evolution of the given topic, with inputs from different nodes at particular times, associated with (i) the given hypergraph edge and (ii) one or more other hypergraph edges contained within the given hypergraph edge, and wherein the interactive visualization tool comprises at least one interface feature for identifying one or more connections between given persons participating in the dialog utilizing hypergraph edge counts pertaining to the number of hypergraph edges to which the nodes corresponding to the given persons are contributors;

wherein the steps are carried out by at least one computing device.

* * * * *